(No Model.) 4 Sheets—Sheet 1.
M. A. KELLER.
COMBINED HAY RAKING AND LOADING MACHINE.
No. 581,735. Patented May 4, 1897.
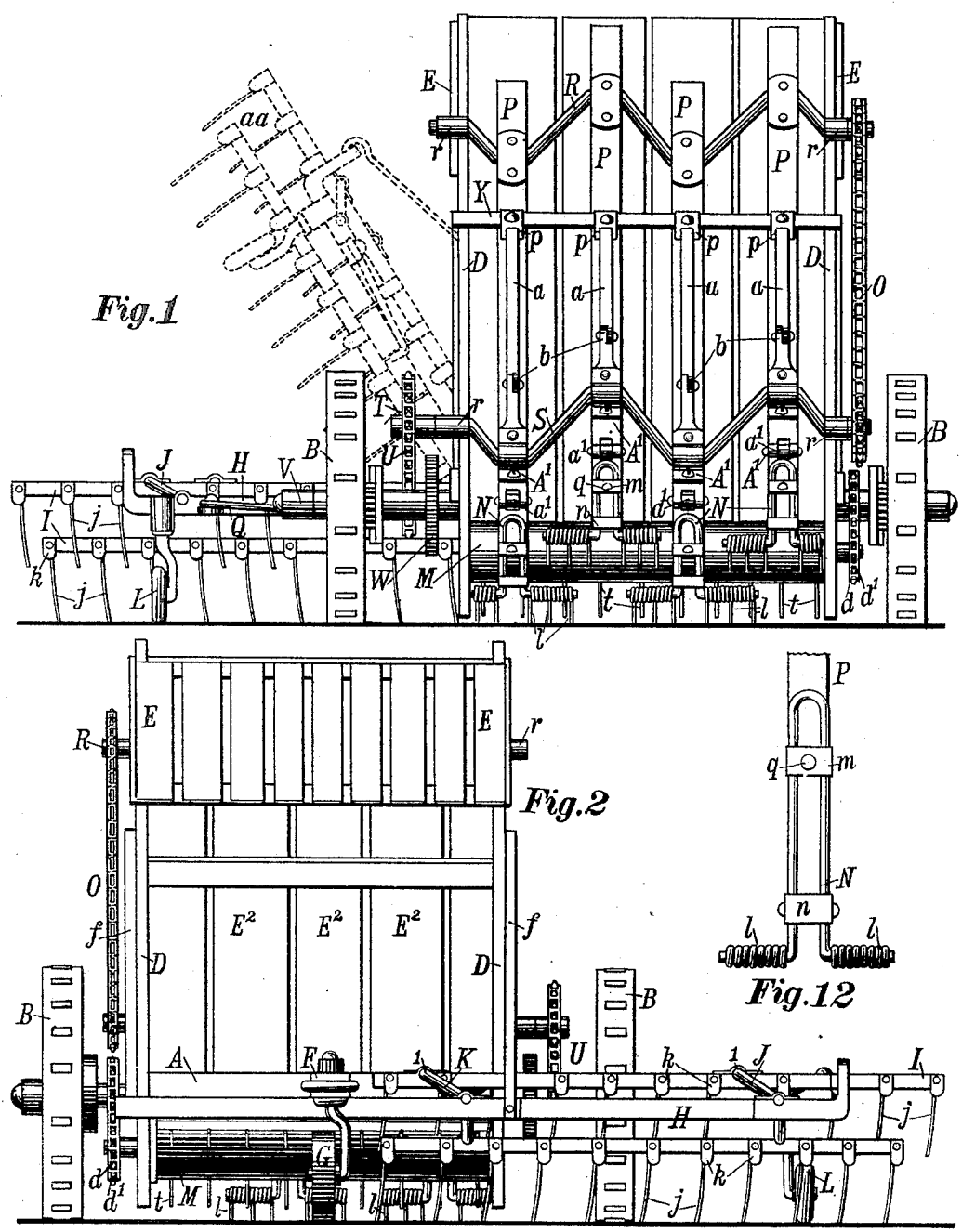
WITNESSES:
E. E. Clinton
John M. Culver
INVENTOR
M. A. Keller
BY R. B. Swift
ATTORNEY.

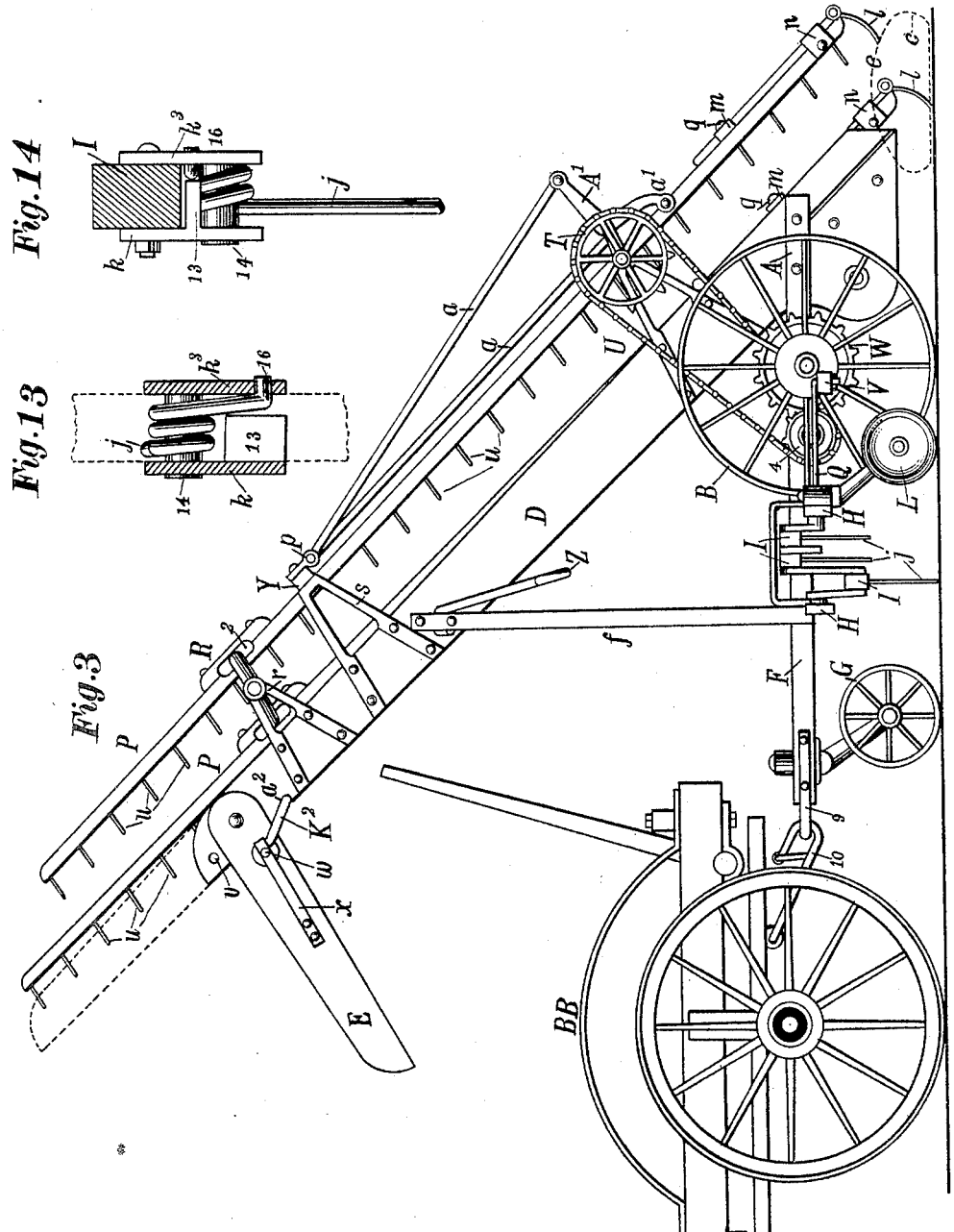

(No Model.) 4 Sheets—Sheet 3.
M. A. KELLER.
COMBINED HAY RAKING AND LOADING MACHINE.
No. 581,735. Patented May 4, 1897.
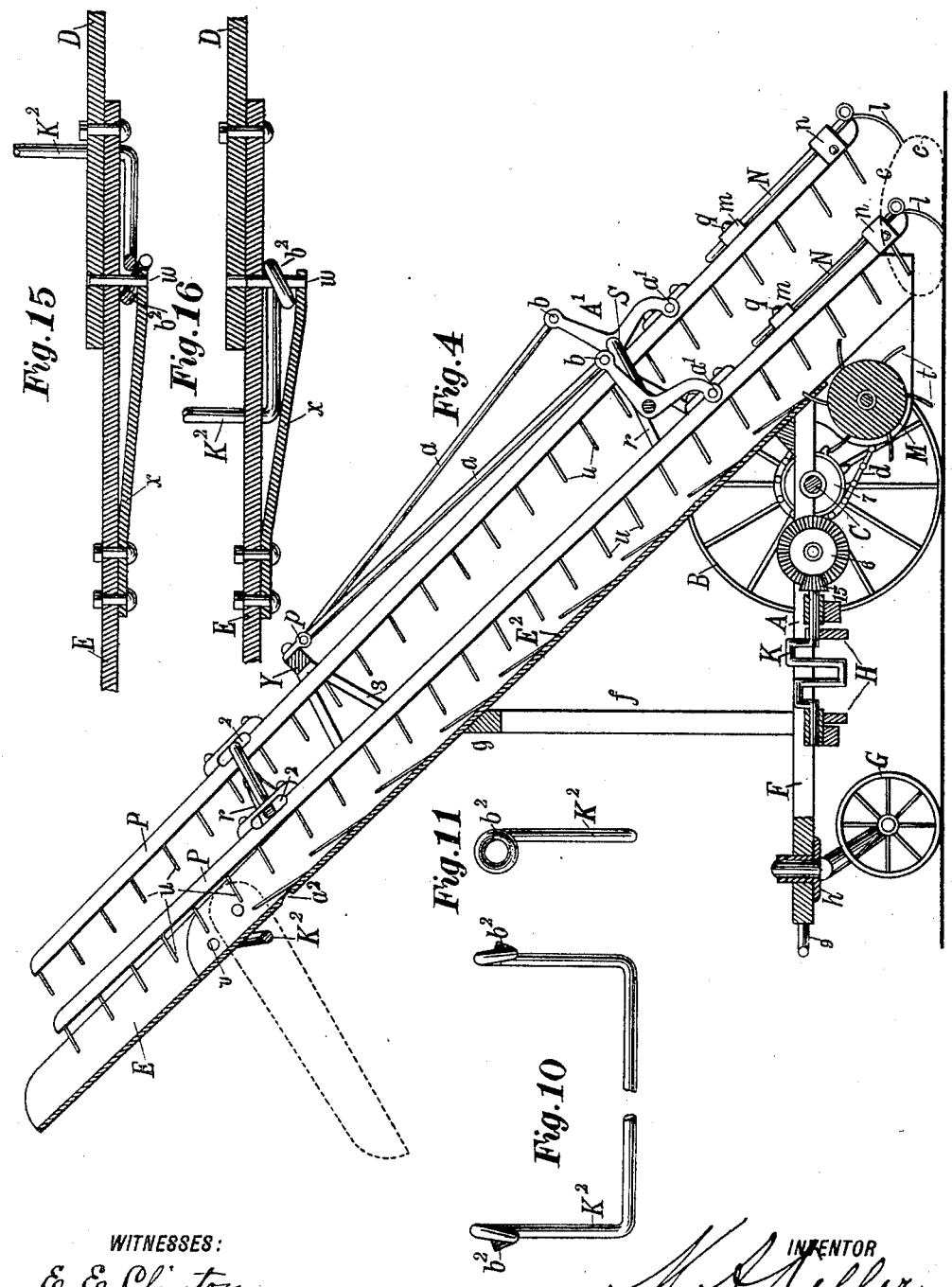
WITNESSES:
E. E. Clinton.
John M. Culver
INVENTOR
M. A. Keller
BY
R. B. Swift
ATTORNEY.

(No Model.) 4 Sheets—Sheet 4.
M. A. KELLER.
COMBINED HAY RAKING AND LOADING MACHINE.
No. 581,735. Patented May 4, 1897.
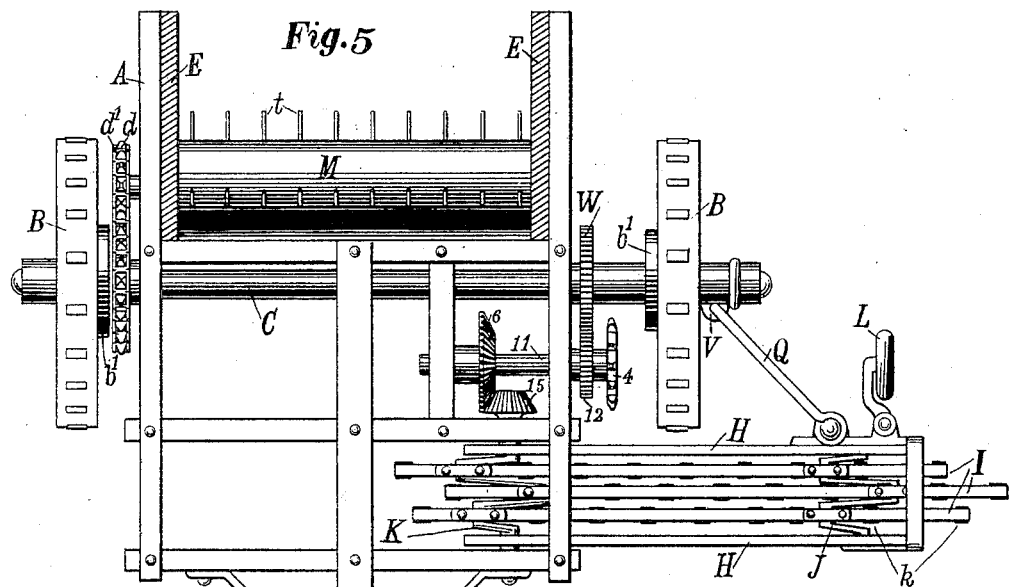
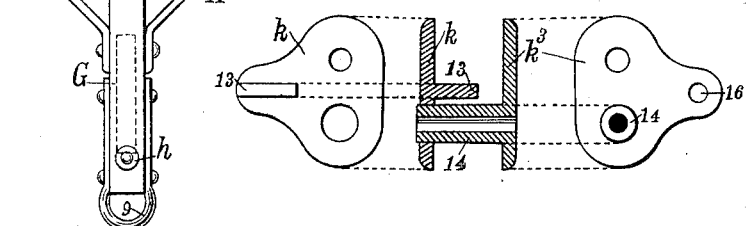
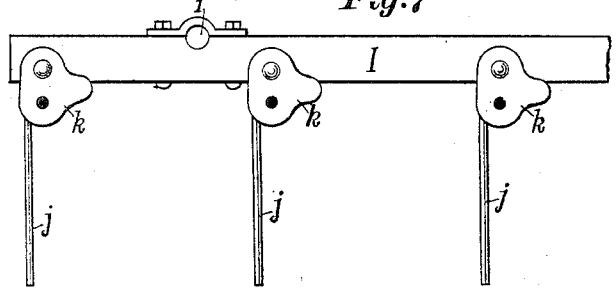
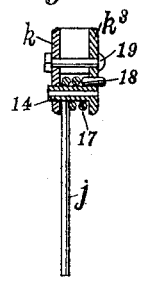
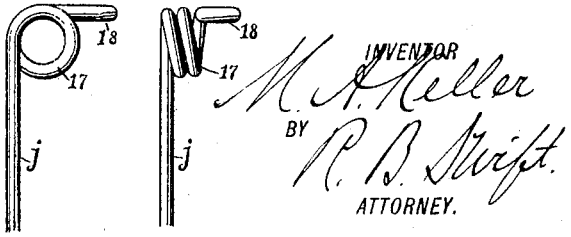
WITNESSES:
E. E. Clinton
John M. Culver
INVENTOR
M. A. Keller
BY
R. B. Swift
ATTORNEY.

United States Patent Office.

MOSES A. KELLER, OF BATAVIA, NEW YORK, ASSIGNOR TO THE McCORMICK HARVESTING MACHINE COMPANY, OF CHICAGO, ILLINOIS.

COMBINED HAY RAKING AND LOADING MACHINE.

SPECIFICATION forming part of Letters Patent No. 581,735, dated May 4, 1897.

Application filed March 11, 1895. Serial No. 541,304. (No model.)

*To all whom it may concern:*

Be it known that I, MOSES A. KELLER, a citizen of the United States, residing at Batavia, in the county of Genesee and State of New York, have invented a new and useful Improvement in a Combined Hay Raking and Loading Machine, of which the following is a specification.

My improvement relates to hay raking and loading machines in which a series of reciprocating cross-rakes at the forward side of the machine rake the hay crosswise of the line of advance of the machine into a windrow at the center of the machine. In practice two series of rakes—that is, one on each side of the machine—are preferably employed. In the annexed drawings, however, but one set of these cross-rakes is shown, as it has been thought that this one set was all that was necessary to show the invention.

The improvement further relates to the construction and arrangement of the raking and elevating mechanism in order to successfully gather the windrow that has been delivered to the center of the machine by the side series of rakes and to the elevation of this windrow to such a height as to allow it to drop upon the wagon.

There are various other detail improvements shown in the drawings which will be described in the specification, all of which make up the combinations shown in the machine.

Figure 1 is a rear view of the machine as it would appear when ready for operation, the dotted lines showing the series of side rakes raised to the side of the elevator and out of action on the hay. Fig. 2 is a front view of the machine as it would appear when ready for operation. Fig. 3 is a side view at the left of the machine, showing the machine coupled to a wagon and ready for its work. In dotted lines the extension to the elevator is shown at its highest position for elevating the hay onto a high load. Fig. 4 is a sectional view through the raking and elevating mechanism, taken from the left hand. Fig. 5 is a top plan view of the machine with the elevator-frame removed; and Figs. 6 to 16, inclusive, are detailed views of parts of the machine.

Similar letters and figures refer to similar parts throughout the several views.

In the drawings, A denotes the main framework of the machine, B the driving-wheels, and C the main axle, which is journaled onto the frame and on which the driving-wheels are placed. The main frame A is rectangular in form and can be made of iron or wood, though in the drawings it is shown made of wood. The pole F is bolted to this frame and is stayed by the diagonal side braces $A^3$. At the front end of the machine, preferably on the pole F, is a caster-wheel G, and its arm is journaled in the casting $h$, so that the wheel G can turn freely in any direction. There is a clevis 9 secured at the end of the pole F, by which the machine is drawn and by which it is conveniently hooked to the wagon. A convenient way of making the attachment to the wagon is shown in Fig. 3, where a special hook 10 has been attached to the wagon. This hook is formed so as to be easily hooked into the clevis 9.

The elevator-frame proper is composed of the side pieces D, posts $f$, and bottom $E^2$, which parts are bolted onto the main frame A, so that the side pieces D and the bottom $E^2$ incline upward and forward at an angle of about forty-five degrees. The posts $f$ support the front of these inclined parts upon the framework of the machine. The upper end of the elevator-frame is preferably extended far enough so that at an angle of forty-five degrees it will be about ten feet from the ground. There is, however, an extension about four feet long hinged to this elevator at its upper end. This extension has been found necessary in order to elevate the hay to the top of the highest loads that it may be desired to load. This feature, however, is shown in another pending application of mine, filed February 6, 1895, Serial No. 537,535.

In order that the hinged extension E can be easily raised and lowered and securely locked in position and that it may be done by the loaders upon the wagon, two springs X have been provided, one on each side of the elevator-frame, which springs have a pin $w$ extending from them and which project through the board E to catch into the holes $v$ in the side boards of the elevator when the extension is raised to its normal position. To disengage the pins from the hole V when it is desired to lower the extension, a cam-rod $K^2$ has been provided, which is journaled on the pins $w$, as is shown more particularly in Figs. 15 and 16, and is positioned between the boards E and the springs X. It is plain that when the arms which control these cams are swung back and forth the cam-part $b^2$ will force the spring X out, and thereby withdraw the pins from the holes $v$, and the extension E can be dropped. When the cam is turned in the other direction, the pins $w$, pressed by the spring X, will enter the hole $v$ whenever the extension E has been raised to its normal position. The cam-arms $K^2$, which are joined by a connecting-rod, are then pushed into the notches $a^2$, formed in the side boards of the elevator, and form a support for the extension E, as shown in Fig. 3. This makes a simple and practical means for securing the extension and one that can be operated from the wagon. The hinged extension when lowered, as shown in Fig. 3, allows the hay to drop from the elevating-rakes more quickly than it would if the hay must be carried to the top of the extension, and thus prevents its being scattered by the wind, as it would be in the long distance it has to drop to the wagon at the time the load is first started.

There are four hangers $r$ secured to the sides D of the elevator-frame, and in these are journaled two crank-shafts R and S, as shown more particularly in Fig. 1, and to these crank-shafts a series of toothed elevating-bars P are journaled, on the upper crank-shaft R by means of a slotted bearing 2 and on the lower crank-shaft S by means of a series of bell-cranks A'. These bell-cranks A' are journaled near their centers to the lower crank-shaft S, their lower ends being pivoted to the bars P at $a'$ and their upper ends being connected to rods $a$, which in turn are hinged at $p$ to a stationary cross-piece Y, that is firmly fixed to the frame of the machine by brackets $x$. A chain O, by means of sprockets, connects and drives the upper crank-shaft R from the lower crank-shaft S. The bars P are provided at their lower ends with adjustable rake-heads N, which can be adjusted up and down the rake-bars P by loosening the screw $q$ and sliding them beneath the plates $m$ and $n$. These rake-heads N are preferably made from a single bar of round steel or pipe in the form shown in Fig. 12 of the drawings.

There are, coiled onto their extensions, which project at right angles to the bar P, raking-teeth $l$, that project from the bar P, thus forming a rake. By means of the adjustment of the rake-head N these rakes can be quickly moved up and down the bar P, so as to be set closer to or farther from the ground, as the condition of the crop may necessitate. A chain-wheel T is secured to the crank-shaft S and receives power, by means of the chain U, from the forward advance of the machine. Because of the arrangement of the bell-crank motion at the lower ends of the bars P and the sliding rotary motion at the upper ends of the bars the rake-heads are caused to have a long raking sweep over the ground, as shown by the dotted oval lines $c$ $c$ in Figs. 3 and 4. As an example of what certain strokes will do, it may be remarked that an eight-inch stroke will give the rake-head a stroke over the ground in a straight line that is three feet long. By this arrangement of motion to the bars P every inch of the ground is raked by a slow motion, and consequently the draft of the machine is lessened and its wear and the strain upon its parts are greatly reduced. By means of the two cranks the machine has a greater capacity to elevate the hay than it would have were the rake-bars reciprocated direct by a single crank at their lower ends and it does the work with much less power. In machines in which the upper ends of the elevating-bars move on slides and the elevating-tines $u$ are entirely disengaged from the hay on the return stroke of the bars P the elevating-tines aggressively forward the hay on their upward stroke and press it down and slide upon it on their return stroke. The hay therefore becomes somewhat packed under the elevating-bars, and as it is forced on by the hay that comes from the lower part of the machine a great compaction results, causing the machine to run very hard, and when the hay is very dry and brittle it is badly broken and damaged. Another result of this compaction of the hay at the upper end of the delivery-bars when they have a sliding motion is that the hay accumulates in bunches and is only discharged when the bunch has received such an impacting motion from the hay below as to start it over the delivery end of the carrier. The loaders upon the wagon can take care of a continuous swath that is reasonably heavy, but when it comes in large masses it is very troublesome. The system of the double cranks obviates these troubles.

In order for a hay-loader to be practically operative, it must not only be capable of taking up the hay from the swath, but it must also have a capacity to take up the hay from the windrow. The hay-loaders now upon the market, raking, as they do, but six or seven feet and being unable, as many of them are, to take the hay from the windrow, a long distance must be traveled in hay of medium growth in order to get a load. In soft meadows the wagon with its load is all that a team can draw, and when the hay-loader is attached behind it the work becomes excessively heavy for the team when continued over a long distance. A toothed elevating-cylinder M is journaled at the lower end of the elevator-frame and for practical operation positioned about twelve inches from the ground and is rotated in the same direction as the elevating-bars P are moved. This cylinder catches the hay that has been raked forward and lifts it by the rake-bars P and the teeth $u$ upon these bars and starts it up the elevator of the machine. By this arrangement the heaviest of windrows can be elevated, while by the long sweeping rake motion of the rakes on the lower ends of the bars P the ground will be thoroughly raked and there will be no necessity of again going over it with a horse hay-rake.

The construction so far described will, as explained, not only take the hay from the swath, but also from the windrow. A series of reciprocating cross-rakes has been provided, as shown in the drawings, positioned at the forward side of the machine to rake the hay from the side of the machine into the sweep of the elevating devices in order to save the expense of a man and team raking the hay into a windrow with an ordinary hay-rake and in order to save the long distances over which the hay-loader would have to be drawn in order to accumulate a load did it only gather a swath of the width of the elevating part. In the drawings there has been shown but a single series of side rakes, but in the practical operation of the machine a second series upon the other side could be positioned, and when the crop was so heavy that the men on the wagon could not take care of all the hay that would be gathered by the two series of reciprocating rakes one of them could be thrown out of action by elevating it to the side of the machine. In light grass the loaders can take care of a sixteen-foot swath, while when the grass is heavier the loaders upon the wagon cannot take care of so much.

The construction of the series of reciprocating cross-rakes is as follows, viz: A crank-shaft K is journaled on the main frame at right angles to the main axle C and is provided with a bevel-pinion 15, which meshes with a bevel-wheel 6, that is keyed to a short shaft 11, that is also journaled upon the frame of the machine parallel with and just in front of the main axle, as shown clearly in Fig. 5. There is also keyed upon this short shaft 11 a spur-pinion 12, that meshes with the spur-wheel W, that is rigidly positioned upon the main axle C of the machine. Power is in this way communicated to the crank-shaft K. A long rectangular frame H H is journaled about the crank-shaft K and is extended to one side of the machine in front of the main driving-wheel of the machine, and its outer end is supported on a caster-wheel L and is also stayed by a movable brace Q, connected to a sleeve V, that is positioned on the end of the main axle C of the machine. Near the outer end of this frame H is journaled a second crank-shaft J, having cranks at different angles, the angles of which cranks correspond with the angles of the cranks upon the shaft K. Rake-bars I are journaled on these cranks, and the power transmitted to the shaft K by the forward advance of the machine causes the shaft to revolve and the bars I to reciprocate and to rise and fall in parallel paths as they are reciprocated back and forth. These bars are provided with a series of yielding rake-teeth $j$, which engage the hay on the ground and move it toward the center of the machine and into the path of the elevating devices. These reciprocating rakes have a rapid motion, and there are a sufficient number of rake-bars, so that the teeth of one of the bars are almost constantly on the ground and in contact with the hay, so they will do a clean job of raking, transporting the hay from the side of the machine into the center. The teeth upon these reciprocating bars are held in position by two plates $k$ and $k^3$, the latter of which is provided with a projection 14 and the hole 16, as more clearly shown in Figs. 6, 7, 8, 13, and 14. The coil 17 of the tooth is slipped onto the projection 14 and its bent end 18 placed in the hole 16. The cap-plate $k$ is then slipped onto the part 14, and by the bolt 19 the plates are secured to the bar I. The ledge 13 of the plate $k$ holds the hook end 18 of the coil in its place. The coil 17 of the tooth will allow the tooth to yield when the progress of the machine brings it into collision with a rigid obstruction, and the breakage of the parts is thus prevented. The method of mounting the teeth, as described, between the two plates $k$ and $k^3$, as is more clearly shown in Figs. 13 and 14, allows the tooth to be quickly replaced should it by any means become broken.

In transporting the machine on the road or through narrow gateways and over narrow bridges the cross-rakes can be folded to the side of the machine, as shown by the dotted lines in Fig. 1. A hooked rod Z at the side of the elevator-frame is provided for the purpose of sustaining the reciprocating side rakes in their elevated position. As heretofore explained, this elevation of one of the series of side rakes may be found necessary when the crop is too heavy to be readily taken care of by the loaders on the wagon.

The machine is thrown into and out of gear by the pawl-and-ratchet mechanism on the main axle C, (shown in Fig. 5 as $b'$, and located at the inside of the driving-wheels.) Power is communicated to the elevating-bars from the sprocket-wheel 4 and the short shaft 11. The chain U transmits power from this sprocket-wheel to the sprocket-wheel T, as has been heretofore explained. The cylinder N receives its motion from the main axle C through the sprocket-wheel and chain $d$ $d'$, and in practice it has been found that the cylinder can run quite slowly about two turns to one turn of the driving-wheels. The tines $t$ of this cylinder are curved back, so they will shed the hay as the cylinder is rotated and not cause it to be carried and wrapped about the cylinder.

The construction of the machine having been fully described and its operation pointed out, what I desire to claim and protect by Letters Patent is—

1. In a combined hay raking and loading machine, the combination substantially as hereinbefore set forth, of the main frame supported on two driving-wheels, the main axle of said wheels journaled on said frame, a cranked shaft journaled on said frame at right angles or nearly so to the longitudinal plane of the said main axle, gears connecting said cranked shaft with the axle whereby power is communicated to said cranked shaft, a supplemental frame journaled about said cranked shaft and extending farther to the side of the machine in front of the driving-wheels and having its outer end supported on a caster-wheel, and braced to the main-wheel axle, a second cranked shaft journaled on said supplemental frame near its outer end, and a series of toothed bars journaled on said cranked shafts adapted to engage the hay on the ground and convey it on a windrow at or near the center of the machine in the path of the loading-elevator.

2. The combination with the inclined elevator-frame, of two revoluble cranked shafts, one being journaled on said frame near the upper end and the other near the lower end of said frame, a series of toothed combined raking and elevating bars having their upper ends journaled directly on the upper cranked shaft by slotted bearings so as to allow said bars to have an independent longitudinal movement on said journals, and their lower ends journaled on bell-cranks which are journaled on the cranks of the lower cranked shaft, and the intermediate connections with the upper ends of the bell-cranks and a stationary support, whereby said bell-cranks are caused to rock as the cranked shaft revolves and cause the lower ends of the raking-bars to have a long sweeping or raking motion over the ground, substantially as shown and described.

3. In combination in a hay-loader, reciprocating elevating-bars, each provided at its lower end with rake-heads, a series of raking-tines each in a row transverse to the raking motion of the elevating-bars attached to the rake-heads, and means for adjusting the rake-heads on the elevating-bars.

4. In combination in a hay-loader, the machine-frame supported upon an axle positioned near the center of the frame, a caster-wheel at the forward end of the frame, a supplemental frame hinged to the main frame between the caster-wheel and the axle, an elevator-frame connected to the rear end of the machine-frame and extending forwardly and upwardly over the frame, reciprocating elevating-bars positioned on the elevator-frame, rake-heads connected to the lower ends of the elevating-bars, and means for adjusting these rake-heads on the bars, substantially as and for the purpose specified.

5. The adjustable rake-heads of the elevating-bars made of a single piece of round metal in the form shown, having each two short arms projecting at right angles to its main body, and having said arms provided with yielding raking-tines, substantially as and for the purpose specified.

6. The combination with the elevator-frame and the hinged extension, of the cam-rod journaled on the locking-pins and operating in conjunction with the locking-springs of said pins, said pins being adapted to engage a hole or catch that is in the elevator-frame, whereby the said hinged extension is locked when in its extended position, and supported by the cam-rod, when in its lowered position, substantially as shown and described.

7. The combination with the reciprocating bars of the cross-rakes, of the teeth-plates $k^3$, having the pin 14, the raking-tooth coiled on said pin and its end secured into the hole 16, the cap-plate K, fitting on the pin 14, and having the projecting ledge 13, to hold the hooked end 18 of the tooth $j$ in its place and the bolt 19, to secure the plates to the bar I.

8. The combination of the reciprocating bars, I, and the removable teeth-plates $k$ and $k^3$, of the raking-tooth, $j$, having the coil 17, with the hooked end, 18, for the purposes set forth.

M. A. KELLER.

Witnesses:
M. E. KELLER,
I. M. KELLER.